(12) United States Patent
Cimberio et al.

(10) Patent No.: US 8,109,297 B2
(45) Date of Patent: Feb. 7, 2012

(54) VALVE ARRANGEMENT FOR USE WITH A WATER METER

(75) Inventors: Roberto Cimberio, San Maurizio d'Opaglio (IT); Jason Uder, Edwardsville, IL (US)

(73) Assignee: FIMCIM SpA, Milan (IT)

( * ) Notice: Subject to any disclaimer, the term of this patent is extended or adjusted under 35 U.S.C. 154(b) by 265 days.

(21) Appl. No.: 12/370,195

(22) Filed: Feb. 12, 2009

(65) Prior Publication Data

US 2010/0200096 A1 Aug. 12, 2010

(51) Int. Cl.
*F16K 11/00* (2006.01)

(52) U.S. Cl. ............... 137/884; 137/315.06; 137/637.3

(58) Field of Classification Search ............ 137/315.06, 137/883, 597, 637.2, 637.3, 884; 251/310, 251/311, 315.01, 315.11
See application file for complete search history.

(56) References Cited

U.S. PATENT DOCUMENTS

| | | | |
|---|---|---|---|
| 1,128,097 A | | 2/1915 | Bockelman |
| 1,462,857 A | * | 7/1923 | Hiller ............................ 137/597 |
| 1,988,003 A | | 1/1935 | Ford |
| 2,574,982 A | | 11/1951 | Mueller et al. |
| 2,632,328 A | | 3/1953 | McChesney |
| 3,256,735 A | * | 6/1966 | Smith ....................... 137/315.06 |
| 3,754,573 A | * | 8/1973 | Bales ............................ 137/886 |
| 3,831,630 A | * | 8/1974 | McGavin ...................... 137/597 |
| 4,082,326 A | * | 4/1978 | Bryson ......................... 285/238 |
| 4,691,727 A | * | 9/1987 | Zorb et al. ................. 137/15.03 |
| 4,726,399 A | | 2/1988 | Miller |
| 4,921,598 A | * | 5/1990 | Desch ........................... 210/136 |
| 6,354,634 B1 | * | 3/2002 | Dischler ....................... 285/231 |
| 6,363,782 B1 | | 4/2002 | Hendey |
| 6,382,679 B1 | | 5/2002 | Hall |
| 6,568,428 B2 | * | 5/2003 | Pecci et al. ................... 137/597 |
| 6,588,800 B1 | | 7/2003 | Meli |
| 2008/0295907 A1 | | 12/2008 | Noll et al. |

FOREIGN PATENT DOCUMENTS

| | | |
|---|---|---|
| DE | 9104036 U1 | 6/1991 |
| DE | 9105195 U1 | 6/1991 |
| DE | 102005010139 A1 | 10/2006 |
| FR | 2800401 A1 | 5/2001 |

OTHER PUBLICATIONS

Section B, Ford Inside Meter Settings, The Ford Meter Box Co., Inc., Jul. 2006, web revision Jan. 2008.

(Continued)

*Primary Examiner* — Kevin Lee
(74) *Attorney, Agent, or Firm* — McKeon, Meunier, Carlin & Curfman, LLC (57) ABSTRACT

Valve arrangements for use with a water meter include a first valve comprising a first valve housing, a first inlet, and a first outlet, the first inlet and the first outlet of the first valve being oriented substantially perpendicular to one another, a second valve comprising a second valve housing, a second inlet, and a second outlet, the second inlet and the second outlet of the second valve being oriented substantially perpendicular to one another; the first inlet of the first valve and the second outlet of the second valve being substantially coaxial with one another, and the first outlet of the first valve and the second inlet of the second valve being oriented substantially 180° apart from one another, with the first valve housing and the second valve housing being joined together by a connection member. The valve arrangement may also be provided as a kit of parts with a set of pipeline attachment members.

14 Claims, 5 Drawing Sheets

OTHER PUBLICATIONS

Section E, Ford Yokes and Yoke Parts, The Ford Meter Box Co., Inc., Dec. 2006.
Section F, Ford Coppersetters, Linesetters, and Resetters, The Ford Meter Box Co., Inc., Jun. 2005, web revision Jan. 2008.
Sections 8.1, 8.2, and 8A.1-8A.52, Copper Meter Yokes, Mueller Co., Revised Apr. 1999 and Aug. 2004.
Copper Meter Insetters, A.Y. McDonald Mfg. Co., Aug. 2007.
Iron Yokes, A.Y. McDonald Mfg. Co., Aug. 2005.
Copper Meter Resetters, A.Y. McDonald Mfg. Co., Aug. 2007.
Copper Meter Setters, A.Y. McDonald Mfg. Co., Jun. 2008.
"Ford Inside Meter Settings," Jan. 1, 2008, The Ford Meter Box Company, Inc., USA.
"Copper Meter Insetters," Aug. 1, 2007, A.Y. McDonald Mfg., Co.
International Search Report and Written Opinion dated May 3, 2010.

* cited by examiner

VALVE ARRANGEMENT FOR USE WITH A WATER METER

FIELD OF THE INVENTION

The present invention relates to valve arrangements for use with water meters.

BACKGROUND OF THE INVENTION

Water meters, especially for determining residential water use or for determining commercial water use, generally have an inlet and an outlet arranged horizontally on left and right sides of the water meter. Plumbing connections are needed to connect the inlet of the water meter to the water main or other source of potable water. Plumbing connections are also needed to connect the outlet of the water meter to the main supply piping for the residence or other structure to be served by the water meter. Typically, these plumbing connections are made on site using various suitable, conventional fittings such as pipe nipples and valves. Although various attempts have been made in the prior art to provide an assembly for facilitating the connection of a water meter to inlet and outlet piping, the need remains for a valve arrangement that facilitates the prompt and efficient connection of a water meter, especially in commercial, domestic or residential settings.

In the prior art, for example, it is known from U.S. Pat. No. 6,588,800 of Meli to provide a connector body in which a pipe loop is provided to receive a water meter between coaxial ends of the pipe loop. A connector body is provided to supply one end of the pipe loop with water and to direct another end of the pipe loop to the structure to be served by the water meter. In the Meli patent, the connector body is configured so that the connector body may be provided within a straight length of pipe with the ends of the pipe loop arranged at right angles to one another.

Various prior art valve arrangements are also known for connecting gas meters to piping. For example, U.S. Pat. No. 6,382,679 of Hall discloses a meter loop frame assembly in which inlet and outlet piping connections are joined together by a brace. The inlet and outlet piping is configured for connection to the top of a gas meter. Similarly, U.S. Pat. No. 2,632,328 of McChesney discloses a gas meter connection assembly in which inlet and outlet piping is connected by a bar. The inlet and outlet piping is arranged to connect to the sides of the gas meter. Other meter piping arrangements are disclosed in U.S. Pat. No. 6,363,782 of Hendey and in U.S. Patent Publication No. 2008/0295907 of Noll et al. U.S. Pat. No. 1,128,097 of Bockelman discloses a shower bath body and U.S. Pat. No. 4,726,399 of Miller discloses a modular manifold having a plurality of fittings.

Water meter installation arrangements are also commercially available from The Ford Meter Box Company, Inc. of Indiana and especially from their website (http://www.ford-meterbox.com/pages/downloads/catalog.htm) at Section B, Section E and Section F. Other water meter installation arrangements are known from the Mueller Company Full Water online catalog in sections 8.1, 8.2, and 8A.1-8A.47 available on the Mueller Company website (www.mueller-company.com/water/products). Other water meter installation arrangements are known from the AY McDonald company website (http://www.aymcdonald.com/water.cfm) in sections identified for Insetters, Iron Meter Yokes, Resetters, and Meter Setters.

Accordingly, the need remains for a valve arrangement for use with a water meter or other metering device to connect the meter to inlet and outlet piping and especially using different joint or coupling configurations in an economical and efficient manner which overcomes the difficulties in the prior art.

SUMMARY OF THE INVENTION

In various preferred embodiments of the present invention, a valve arrangement for use with a water meter comprises a first valve comprising a first valve housing, a first inlet, and a first outlet, with the first inlet and the first outlet of the first valve being oriented substantially perpendicular to one another. A second valve comprises a second valve housing, a second inlet, and a second outlet, with the second inlet and the second outlet of the second valve being oriented substantially perpendicular to one another. The first inlet of the first valve and the second outlet of the second valve are substantially coaxial with one another, and the first outlet of the first valve and the second inlet of the second valve are oriented substantially 180° apart from one another. The first valve housing and the second valve housing are joined together by a connection member.

In a preferred embodiment, the connection member is integrally provided with the first valve housing and the second valve housing, and the connection member does not provide fluid communication between the first valve and the second valve.

In another preferred embodiment, the connection member is solid and each of the first inlet and the second outlet comprises male threads.

In another preferred embodiment, each of the first inlet and the second outlet may comprise a swivel nut having female threads.

In another preferred embodiment, the valve arrangement further comprises a pipeline attachment member for the first inlet. The pipeline attachment member may comprise a compression joint for copper pipe, or a compression joint for steel pipe, or a press fitting for copper pipe, or a press fitting for steel pipe, or a capillary end joint for copper pipe, or a male thread joint fitting, or a female thread joint fitting.

In another preferred embodiment, the valve arrangement further comprises a first substantially U-shaped conduit having a first end in fluid communication with the first outlet and a second end adapted for connection to an inlet of a water meter; and, a second substantially U-shaped conduit having a first end in fluid communication with the second inlet and a second end adapted for connection to an outlet of the water meter. The second end of the first substantially U-shaped conduit and the second end of the second substantially U-shaped conduit are preferably generally opposite one another to receive the water meter therebetween.

In another preferred embodiment, a kit of parts comprises: 1) a valve arrangement comprising a first valve comprising a first valve housing, a first inlet, and a first outlet, the first inlet and the first outlet of the first valve being oriented substantially perpendicular to one another, a second valve comprising a second valve housing, a second inlet, and a second outlet, the second inlet and the second outlet of the second valve being oriented substantially perpendicular to one another, with the first inlet of the first valve and the second outlet of the second valve being substantially coaxial with one another, and the first outlet of the first valve and the second inlet of the second valve being oriented substantially 180° apart from one another, and, a connection member, with the first valve housing and the second valve housing being joined together by the connection member, with the connection member being integrally provided with the first valve housing and the second valve housing, and wherein the connection member does not provide fluid communication between the first valve and the second valve; and, 2) a set of pipeline attachment members, at least one of the pipeline attachment members comprising a compression joint for copper pipe, at least one of the pipeline attachment members comprising a compression joint for steel pipe, at least one of the pipeline attachment members comprising a press fitting for copper pipe, and at least one of the pipeline attachment members comprising a press fitting for steel pipe.

In another preferred embodiment, in the kit of parts each of the first inlet and the second outlet comprises male threads.

In another preferred embodiment, each of the first inlet and the second outlet may comprise a swivel nut having female threads.

In another preferred embodiment, the kit of parts further comprises a first substantially U-shaped conduit having a first end in fluid communication with the first outlet and a second end adapted for connection to an inlet of a water meter, and, a second substantially U-shaped conduit having a first end in fluid communication with the second inlet and a second end adapted for connection to an outlet of the water meter. The second end of the first substantially U-shaped conduit and the second end of the second substantially U-shaped conduit preferably are generally opposite one another to receive the water meter therebetween. In another preferred embodiment, the pipeline attachment members comprise at least one capillary end joint for copper pipe, at least one male thread joint fitting, and at least one female thread joint fitting

BRIEF DESCRIPTION OF THE DRAWING FIGURES

The present invention will appear more clearly from the following detailed description of several embodiments illustrated in the enclosed figures in which.

DETAILED DESCRIPTION OF THE PREFERRED EMBODIMENTS

Figure 1:
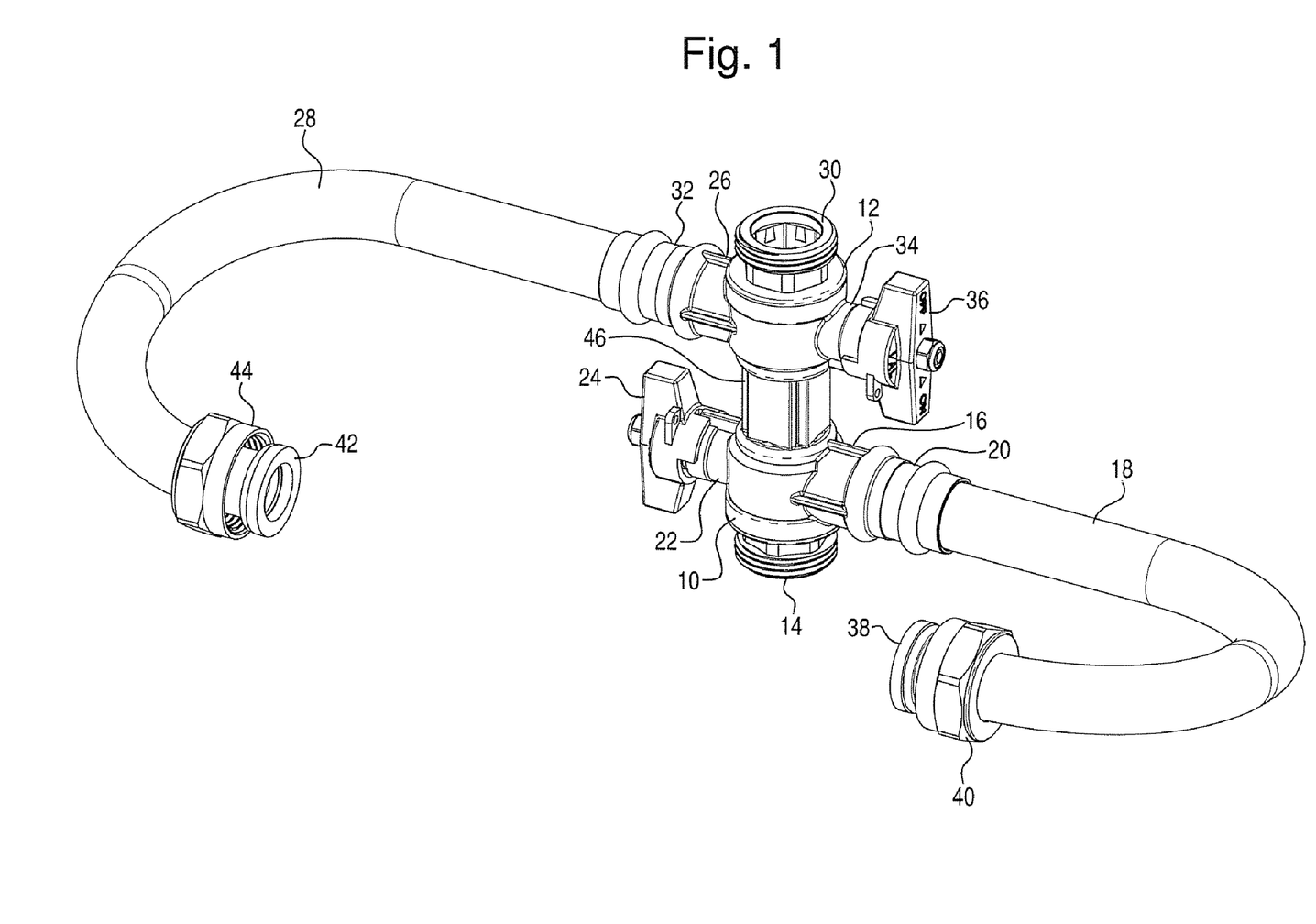
FIG. 1 is a schematic view of a valve arrangement for use with a water meter (not shown) according to the present invention.
Figure 1A:
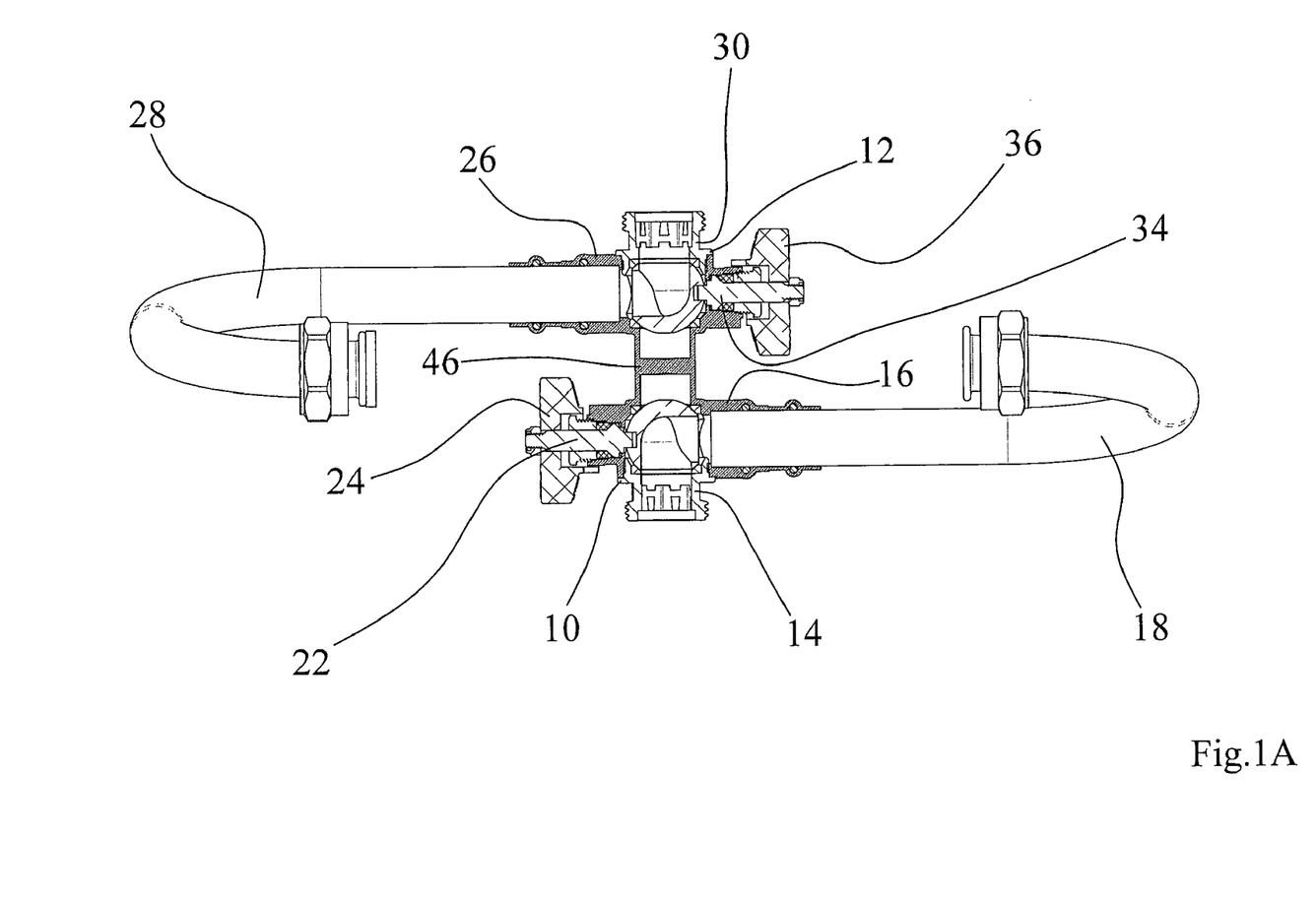
FIG. 1A is a cross-sectional view of the valve arrangement of FIG. 1.

With reference to FIG. 1, a preferred embodiment of a valve arrangement for use with a water meter includes a first valve 10 and a second valve 12. The first valve 10 has a first inlet 14 which in this preferred embodiment has male threads. The first valve 10 has a first outlet 16 which is connected to a first generally U-shaped conduit 18. The first generally U-shaped conduit 18 is preferably connected to the first outlet 16 by a press fitting connection 20. If desired, the first generally U-shaped conduit 18 may be connected to the first outlet 16 by brazing (not shown) or by a soldered connection (not shown) or by any other suitable connection for plumbing fittings as readily apparent to one of ordinary skill in the art. A valve actuator 22 for the first valve 10 has a handle 24 which may be rotated preferably through 90° to open and close the first valve 10. For example, when the valve actuator 22 is in a first position, fluid communication is permitted between the first inlet 14 and the first outlet 16 and when the valve actuator is moved to a second position (e.g., rotated through 90°) fluid communication between the first inlet 14 and the first outlet 16 is prohibited.

The second valve 12 has a second inlet 26 which is connected to a second generally U-shaped conduit 28. The second valve 12 also has a second outlet 30 which in this preferred embodiment has male threads. The second generally U-shaped conduit 28 is preferably connected to the second inlet 26 by a press fitting connection 32. If desired, the second generally U-shaped conduit 28 may be connected to the second inlet 26 by brazing (not shown) or by a soldered connection (not shown) or by any other suitable connection for plumbing fittings as readily apparent to one of ordinary skill in the art. A valve actuator 34 for the second valve 12 has a handle 36 which may be rotated preferably through 90° to open and close the second valve 12. For example, when the valve actuator 34 is in a first position, fluid communication is permitted between the second inlet 26 and the second outlet 30 and when the valve actuator is moved to a second position (e.g., rotated through 90°) fluid communication between the first inlet 26 and the first outlet 30 is prohibited.

The first generally J-shaped conduit 18 has a second end 38 provided with a swivel nut 40 for connection to an inlet of a water meter (not shown). Similarly, the second generally U-shaped conduit 28 has a second end 42 provided with a swivel nut 44 for connection to an outlet of a water meter (not shown). The first generally U-shaped conduit 18 is oriented slightly upwardly and the second generally U-shaped conduit 28 is oriented slightly downwardly so that the ends of the conduits 18, 28 are generally coaxial with one another and spaced apart a distance corresponding to the distance between the inlet and outlet of the water meter to be installed therebetween. The ends 38, 42 of the generally U-shaped conduits 18, 28 may be provided with appropriate flanges or other connection configurations depending upon the configuration of the water meter (not shown) to be connected to the generally U-shaped conduits.

A connection member 46 is provided between the first valve 10 and the second valve 12 to rigidly connect the two valves together. In the preferred embodiment, the connection member is solid and has flat surfaces to facilitate the use of a wrench to prevent rotation of the connection member while the first inlet 14 and the second outlet 30 are being connected to other plumbing fittings. In addition, the connection member 46 has a sufficient height to permit unobstructed movement of the valve handles 24, 36 between the open configuration and the closed configuration of the respective valves 10, 12.

In the preferred embodiment, the connection member 46 is formed together with the housing for the first valve 10 and the housing for the second valve 12. For example, the first valve housing, the second valve housing and the connection member 46 may be formed as a unitary member in a single forging.

In the preferred embodiment, the connection member 46 connects the first valve 10 to the second valve 12 but does not permit fluid communication between the valves through the connection member. Instead, fluid communication is permitted through the first valve inlet 14 to the first valve outlet 16 and then through the first generally U-shaped conduit 18 and through the water valve (not shown) and then through the second generally U-shaped conduit 28 to the second inlet 26 and then through the second outlet 30.

In the preferred embodiment, the connection member 46 connects the first valve 10 to the second valve 12 with the first inlet 14 generally coaxial with the second outlet 30 and with the first outlet 16 oriented generally 180° apart from the second inlet 26. In this way, the ends of the first and second generally U-shaped conduits 18, 28 may be oriented opposite one another and coaxial to one another so as to receive the water meter therebetween.

Figure 2A:
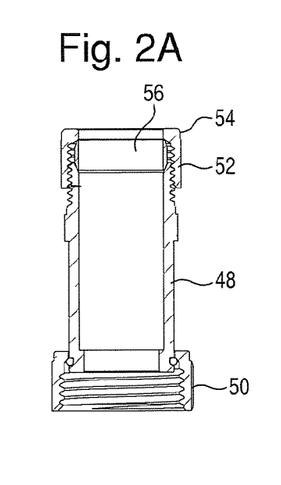
FIG. 2A is a side view in cross-section of a compression joint for copper pipe for use with the valve arrangement of FIG. 1.

With reference now to FIG. 2A, a compression joint for copper pipe 48 includes a first end having a swivel nut 50 with female threads to be received by the first inlet 14 or by the second outlet 30. The compression joint for copper pipe 48 also includes a compression joint 52 comprising a nut 54 and a tapered annular member 56. In use, an end of copper pipe (not shown) is inserted into the compression joint 52 and the nut 54 is tightened to urge the tapered annular member 56 downwardly to securely join the copper pipe to the compression joint for copper pipe 48.

Figure 2B:
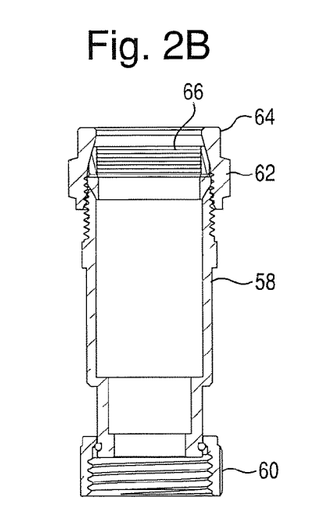
FIG. 2B is a side view in cross-section of a compression joint for steel pipe for use with the valve arrangement of FIG. 1.

With reference now to FIG. 2B, a compression joint for steel pipe 58 includes a first end having a swivel nut 60 with female threads to be received by the first inlet 14 or by the second outlet 30. The compression joint for steel pipe 58 also includes a compression joint 62 comprising a nut 64 and a tapered annular member 66. The tapered annular member preferably includes annular ridges to grip the steel pipe and may comprise a two-part configuration with an annular sealing ring in a suitable, conventional manner readily apparent to one of ordinary skill in the art. In use, an end of steel pipe (not shown) is inserted into the compression joint 62 and the nut 64 is tightened to urge the tapered annular member 66 downwardly to securely join the steel pipe to the compression joint for steel pipe 58. As shown in FIG. 2B, the end of the compression joint for steel pipe that receives the steel pipe may be enlarged with respect to the end that is to be connected to either the first inlet 14 or the second outlet 30 in order to accommodate the diameter of the steel pipe to be connected.

Figure 2C:
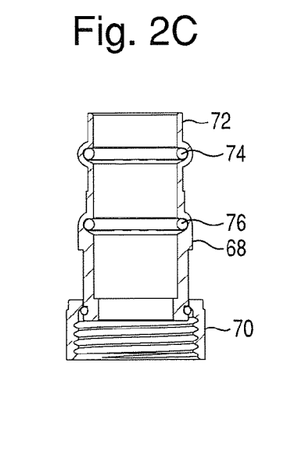
FIG. 2C is a side view in cross-section of a press fitting for copper pipe for use with the valve arrangement of FIG. 1.

With reference now to FIG. 2C, a press fitting for copper pipe 68 includes a first end having a swivel nut 70 with female threads to be received by the first inlet 14 or by the second outlet 30. The press fitting for copper pipe 68 also includes a press fitting 72 comprising a first ring 74 and a second ring 76. In use, an end of copper pipe (not shown) is inserted into the press fitting 72 and the press fitting is compressed in a tool to deform the press fitting about the copper pipe to sealingly and securely connect the copper pipe to the press fitting 72.

Figure 2D:
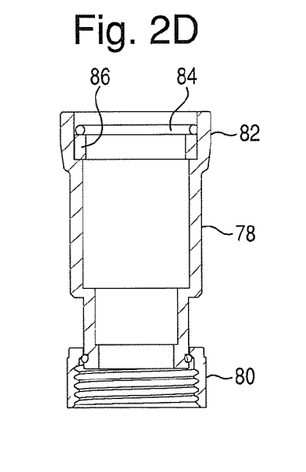
FIG. 2D is a side view in cross-section of a press fitting for steel pipe for use with the valve arrangement of FIG. 1.

With reference now to FIG. 2D, a press fitting for steel pipe 78 includes a first end having a swivel nut 80 with female threads to be received by the first inlet 14 or by the second outlet 30. The press fitting for steel pipe 78 also includes a press fitting 82 comprising a first ring 84 and a second annular member 86. In use, an end of steel pipe (not shown) is inserted into the press fitting 82 and the press fitting is compressed in a tool to deform the press fitting about the steel pipe to sealingly and securely connect the steel pipe to the press fitting 82.

Figure 2E:
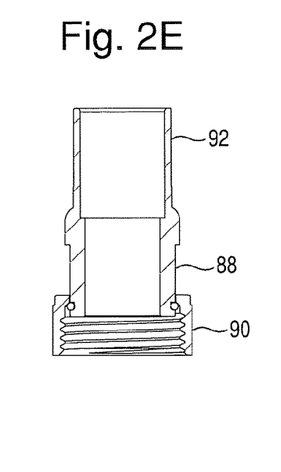
FIG. 2E is a side view in cross-section of a capillary end joint for copper pipe for use with the valve arrangement of FIG. 1.

With reference now to FIG. 2E, a capillary end joint fitting or a sweat fitting for making a soldering connection for copper pipe 88 includes a first end having a swivel nut 90 with female threads to be received by the first inlet 14 or by the second outlet 30. The capillary end joint fitting or the sweat fitting for making a soldering connection for copper pipe 88 also includes a section of piping or tubing 92. In use, an end of copper pipe (not shown) is inserted into the section of piping or tubing 92 and the fitting 88 is soldered to the copper pipe to sealingly and securely connect the copper pipe to the fitting 88.

Figure 2F:
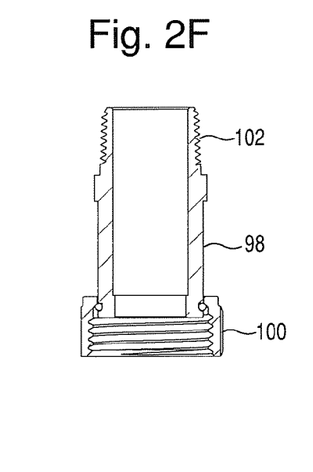
FIG. 2F is a side view in cross section of a male thread joint fitting for steel pipe for use with the valve arrangement of FIG. 1.

With reference now to FIG. 2F, a male thread joint fitting for steel pipe 98 includes a first end having a swivel nut 100 with female threads to be received by the first inlet 14 or by the second outlet 30. The male thread joint fitting for steel pipe 98 also includes a second end with male threads 102. In use, the second end with male threads 102 is received by a plumbing fitting with female threads (not shown) to sealingly and securely connect the plumbing fitting to the fitting 98.

Figure 2G:
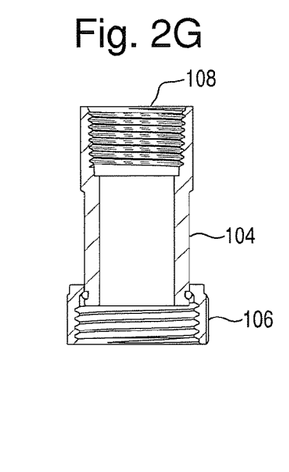
FIG. 2G is a side view in cross section of a female thread joint fitting for steel pipe for use with the valve arrangement of FIG. 1.

With reference now to FIG. 2G, a female thread joint fitting for steel pipe 104 includes a first end having a swivel nut 106 with female threads to be received by the first inlet 14 or by the second outlet 30. The female thread joint fitting for steel pipe 104 also includes a second end with female threads 108. In use, the second end with female threads 108 receives male threads of a plumbing fitting (not shown) to sealingly and securely connect the plumbing fitting to the fitting 104.

Figure 2H:
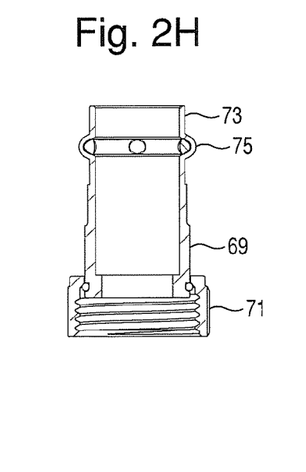
FIG. 2H is a side view in cross section of another press fitting for copper pipe for use with the valve arrangement of FIG. 1.

With reference now to FIG. 2H, a press fitting for copper pipe 69 includes a first end having a swivel nut 71 with female threads to be received by the first inlet 14 or by the second outlet 30. The press fitting for copper pipe 69 also includes a press fitting 73 comprising a first ring 75. In use, an end of copper pipe (not shown) is inserted into the press fitting 73 and the press fitting is compressed in a tool to deform the press fitting about the copper pipe to sealingly and securely connect the copper pipe to the press fitting 73. In this way, the press fitting for copper pipe 69 of FIG. 2H has one ring 75 rather than the two rings 74, 76 of the press fitting 68 of FIG. 2C to provide a lighter and less expensive press fitting.

Figure 3:
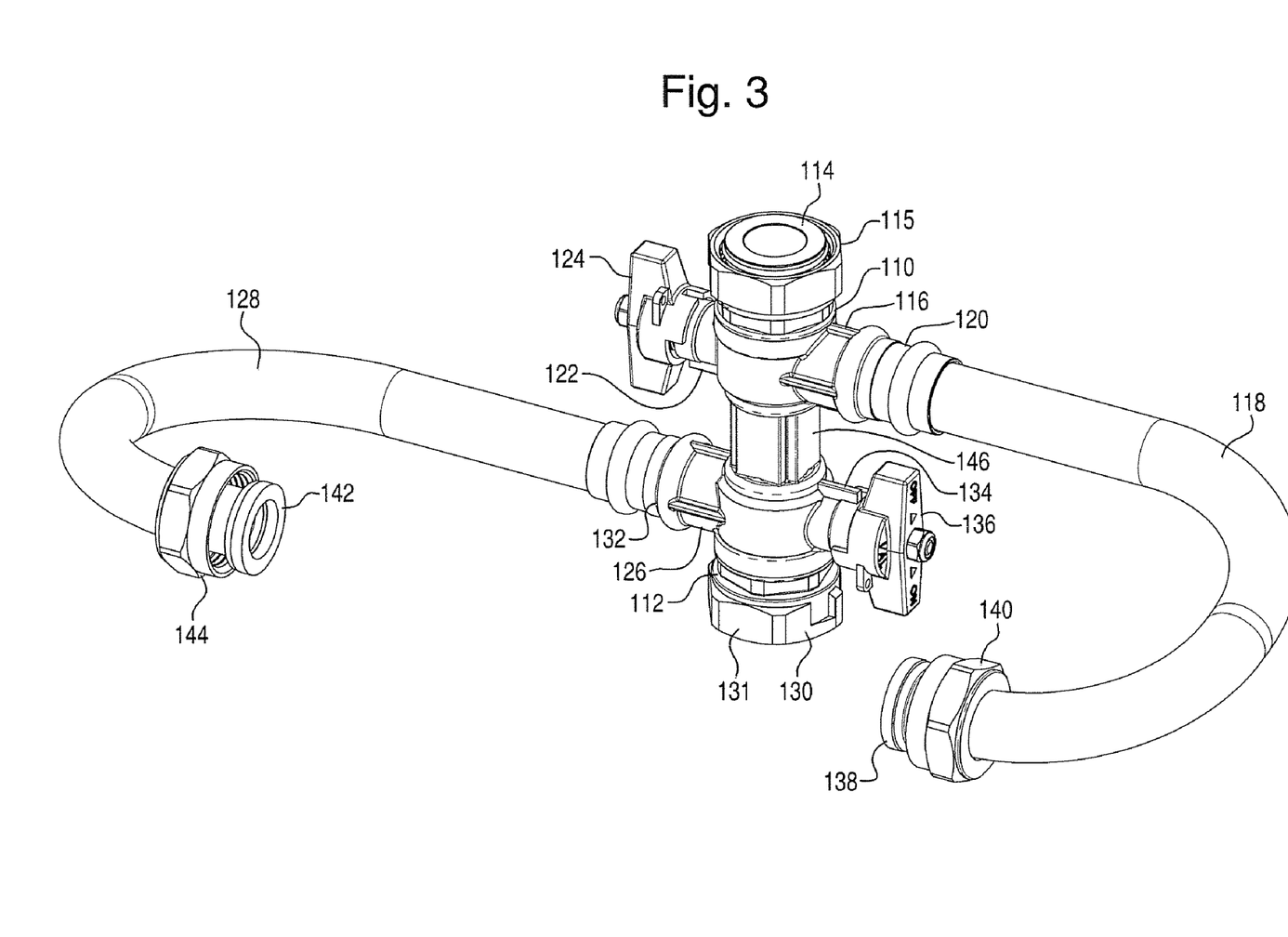
FIG. 3 is a schematic view of another valve arrangement for use with a water meter (not shown) according to the present invention.

With reference now to FIG. 3, another preferred embodiment of a valve arrangement for use with a water meter includes a first valve 110 and a second valve 112. In this embodiment, the first valve 110 is provided above the second valve 112 to accommodate an arrangement in which the supply of potable water is provided from above rather than from below. In addition, as discussed more fully below, the first inlet and the second outlet of the valves are provided with swivel nuts rather than with male threads. If desired, the embodiment of FIG. 1 may be provided with swivel nut connections for the first inlet and the second outlet or the embodiment of FIG. 3 may be provided with male threads for the first inlet and the second outlet.

With continued reference to the embodiment of FIG. 3, the first valve 110 has a first inlet 114 which in this preferred embodiment has a swivel nut 115. The first valve 110 has a first outlet 116 which is connected to a first generally U-shaped conduit 118. The first generally U-shaped conduit 118 is preferably connected to the first outlet 116 by a press fitting connection 120. If desired, the first generally U-shaped conduit 118 may be connected to the first outlet 116 by brazing (not shown) or by a soldered connection (not shown) or by any other suitable connection for plumbing fittings as readily apparent to one of ordinary skill in the art. A valve actuator 122 for the first valve 110 has a handle 124 which may be rotated preferably through 90° to open and close the first valve 110. For example, when the valve actuator 122 is in a first position, fluid communication is permitted between the first inlet 114 and the first outlet 116 and when the valve actuator is moved to a second position (e.g., rotated through 90°) fluid communication between the first inlet 114 and the first outlet 116 is prohibited.

The second valve 112 has a second inlet 126 which is connected to a second generally U-shaped conduit 128. The second valve 112 also has a second outlet 130 which in this preferred embodiment has a swivel nut 131. The second generally U-shaped conduit 128 is preferably connected to the second inlet 126 by a press fitting connection 132. If desired, the second generally U-shaped conduit 128 may be connected to the second inlet 126 by brazing (not shown) or by a soldered connection (not shown) or by any other suitable connection for plumbing fittings as readily apparent to one of ordinary skill in the art. A valve actuator 134 for the second valve 112 has a handle 136 which may be rotated preferably through 90° to open and close the second valve 112. For example, when the valve actuator 134 is in a first position, fluid communication is permitted between the second inlet 126 and the second outlet 130 and when the valve actuator is moved to a second position (e.g., rotated through 90°) fluid communication between the first inlet 126 and the first outlet 130 is prohibited.

The first generally U-shaped conduit 118 has a second end 138 provided with a swivel nut 140 for connection to an inlet of a water meter (not shown). Similarly, the second generally U-shaped conduit 128 has a second end 142 provided with a swivel nut 144 for connection to an outlet of a water meter (not shown). The first generally U-shaped conduit 118 is oriented slightly downwardly and the second generally U-shaped conduit 128 is oriented slightly upwardly so that the ends of the conduits 118, 128 are generally coaxial with one another and spaced apart a distance corresponding to the distance between the inlet and outlet of the water meter to be installed therebetween. Of course, if the desired flow through the water meter is left to right rather than right to left, the inlets and outlets of the valve arrangement would be reversed as apparent to one of ordinary skill in the art.

The ends 138, 142 of the generally U-shaped conduits 118, 128 maybe provided with appropriate flanges or other connection configurations depending upon the configuration of the water meter (not shown) to be connected to the generally U-shaped conduits.

A connection member 146 is provided between the first valve 110 and the second valve 112 to rigidly connect the two valves together. In the preferred embodiment, the connection member is solid and has flat surfaces to facilitate the use of a wrench to prevent rotation of the connection member while the first inlet 114 and the second outlet 130 are being connected to other plumbing fittings. In addition, the connection member 146 has a sufficient height to permit unobstructed movement of the valve handles 124, 136 between the open configuration and the closed configuration of the respective valves 110, 112.

In the preferred embodiment, the connection member 146 connects the first valve 110 to the second valve 112 but does not permit fluid communication between the valves through the connection member. Instead, fluid communication is permitted through the first valve inlet 114 to the first valve outlet 116 and then through the first generally U-shaped conduit 118 and through the water valve (not shown) and then through the second generally U-shaped conduit 128 to the second inlet 126 and then through the second outlet 130.

In the preferred embodiment, the connection member 146 connects the first valve 110 to the second valve 112 with the first inlet 114 generally coaxial with the second outlet 130 and with the first outlet 116 oriented generally 180° apart from the second inlet 126. In this way, the ends of the first and second generally U-shaped conduits 118, 128 may be oriented opposite one another and coaxial to one another so as to receive the water meter therebetween.

Figure 4A:
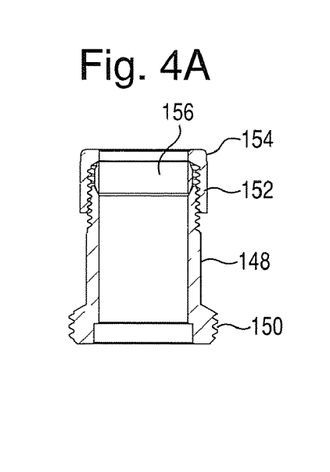
FIG. 4A is a side view in cross-section of a compression joint for copper pipe for use with the valve arrangement of FIG. 3.

With reference now to FIG. 4A, a compression joint for copper pipe 148 includes a first end having male threads 150 to be received by the swivel nut 115, 131 of the first inlet 114 or the second outlet 130. The compression joint for copper pipe 148 also includes a compression joint 152 comprising a nut 154 and a tapered annular member 156. In use, an end of copper pipe (not shown) is inserted into the compression joint 152 and the nut 154 is tightened to urge the tapered annular member 156 downwardly to securely join the copper pipe to the compression joint for copper pipe 148.

Figure 4B:
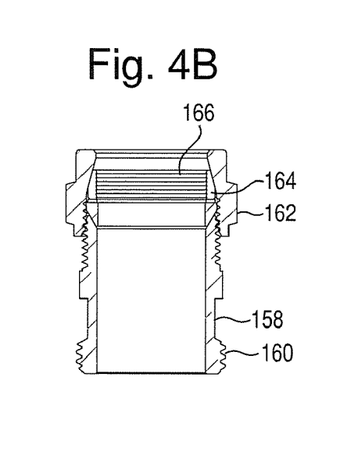
FIG. 4B is a side view in cross-section of a compression joint for steel pipe for use with the valve arrangement of FIG. 3.

With reference now to FIG. 4B, a compression joint for steel pipe 158 includes a first end having male threads 160 to be received by the swivel nut of the first inlet 114 or the second outlet 130. The compression joint for steel pipe 158 also includes a compression joint 162 comprising a nut 164 and a tapered annular member 166. The tapered annular member preferably includes annular ridges to grip the steel pipe and may comprise a two-part configuration with an annular sealing ring in a suitable, conventional manner readily apparent to one of ordinary skill in the art. In use, an end of steel pipe (not shown) is inserted into the compression joint 162 and the nut 164 is tightened to urge the tapered annular member 166 downwardly to securely join the steel pipe to the compression joint for steel pipe 158. The end of the compression joint for steel pipe that receives the steel pipe may be enlarged with respect to the end that is to be connected to either the first inlet 114 or the second outlet 130 in order to accommodate the diameter of the steel pipe to be connected.

Figure 4C:
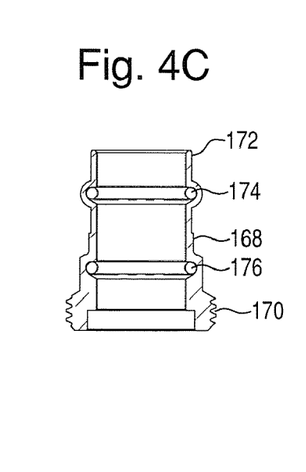
FIG. 4C is a side view in cross-section of a press fitting for copper pipe for use with the valve arrangement of FIG. 3.

With reference now to FIG. 4C, a press fitting for copper pipe 168 includes a first end having male threads 170 to be received by a swivel nut of the first inlet 114 or the second outlet 130. The press fitting for copper pipe 168 also includes a press fitting 172 comprising a first ring 174 and a second ring 176. In use, an end of copper pipe (not shown) is inserted into the press fitting 172 and the press fitting is compressed in a tool to deform the press fitting about the copper pipe to sealingly and securely connect the copper pipe to the press fitting 172.

Figure 4D:
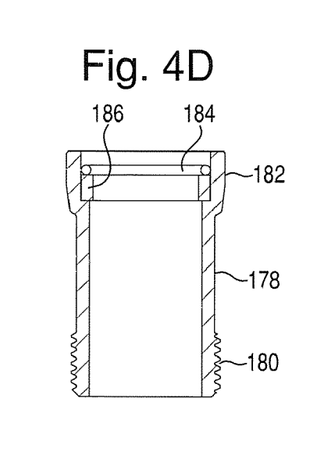
FIG. 4D is a side view in cross-section of a press fitting for steel pipe for use with the valve arrangement of FIG. 3.

With reference now to FIG. 4D, a press fitting for steel pipe 178 includes a first end having male threads 180 to be received by the swivel nut of the first inlet 114 or the second outlet 130. The press fitting for steel pipe 178 also includes a press fitting 182 comprising a first ring 184 and a second annular member 186. In use, an end of steel pipe (not shown) is inserted into the press fitting 178 and the press fitting is compressed in a tool to deform the press fitting about the steel pipe to sealingly and securely connect the steel pipe to the press fitting 178.

Figure 4E:
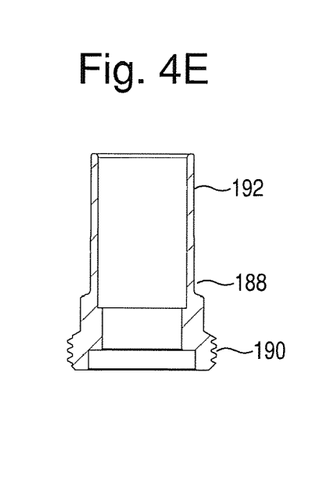
FIG. 4E is a side view in cross-section of a capillary end joint for copper pipe for use with the valve arrangement of FIG. 3.

With reference now to FIG. 4E, a capillary end joint fitting or a sweat fitting for making a soldering connection for copper pipe 188 includes a first end 190 with male threads to be received by the swivel nut of the first inlet 114 or the second outlet 130. The capillary end joint fitting or the sweat fitting for making a soldering connection for copper pipe 188 also includes a section of piping or tubing 192. In use, an end of copper pipe (not shown) is inserted into the section of piping or tubing 192 and the fitting 188 is soldered to the copper pipe to sealingly and securely connect the copper pipe to the fitting 188.

Figure 4F:
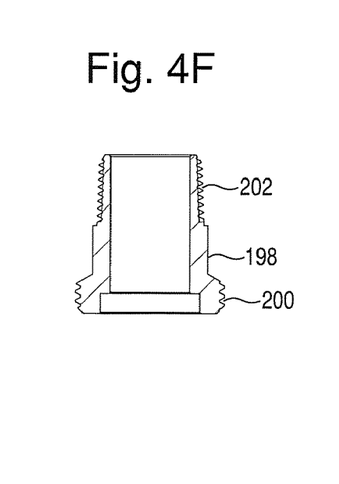
FIG. 4F is a side view in cross section of a male thread joint fitting for steel pipe for use with the valve arrangement of FIG. 3.

With reference now to FIG. 4F, a male thread joint fitting for steel pipe 198 includes a first end 200 with male threads to be received by the swivel nut of the first inlet 114 or the second outlet 130. The male thread joint fitting for steel pipe 198 also includes a second end with male threads 202. In use, the second end with male threads 202 is received by a plumbing fitting with female threads (not shown) to sealingly and securely connect the plumbing fitting to the fitting 198.

Figure 4G:
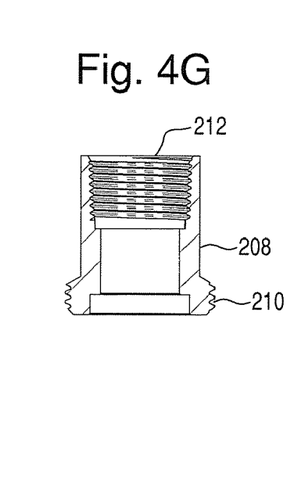
FIG. 4G is a side view in cross section of a female thread joint fitting for steel pipe for use with the valve arrangement of FIG. 3; and, FIG. 4H is a side view in cross section of another press fitting for copper pipe for use with the valve arrangement of FIG. 3.

With reference now to FIG. 4G, a female thread joint fitting for steel pipe 208 includes a first end 210 with male threads to be received by the swivel nut of the first inlet 114 or the second outlet 130. The female thread joint fitting for steel pipe 208 also includes a second end with female threads 212. In use, the second end with female threads 212 receives male threads of a plumbing fitting (not shown) to sealingly and securely connect the plumbing fitting to the fitting 208.

Figure 4H:
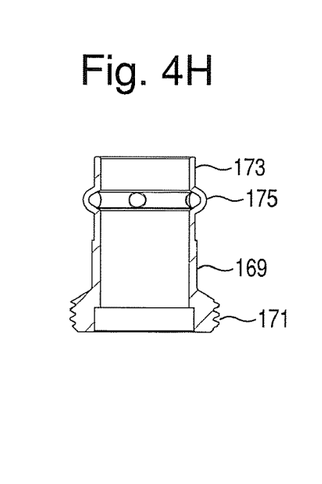

With reference now to FIG. 4H, a press fitting for copper pipe 169 includes a first end having 171 with male threads to be received by the swivel nut of the first inlet 114 or the second outlet 130. The press fitting for copper pipe 169 also includes a press fitting 173 comprising a first ring 175. In use, an end of copper pipe (not shown) is inserted into the press fitting 173 and the press fitting is compressed in a tool to deform the press fitting about the copper pipe to sealingly and securely connect the copper pipe to the press fitting 173. In this way, the press fitting for copper pipe 169 of FIG. 4H has one ring 175 rather than the two rings 174, 176 of the press fitting 168 of FIG. 4C to provide a lighter and less expensive press fitting.

In a preferred embodiment, the valve arrangement of FIG. 1 is provided as a kit of parts with two joint fittings of each type shown in FIGS. 2A, 2B, 2C, 2D, 2E, 2F, 2G, and 2H. In this way, a plumber or other installer of the water meter would have an assortment of connection options to readily facilitate installation of the water meter to the residence or other structure. Similarly, if the valve arrangement of FIG. 3 is selected, the valve arrangement is provided as a kit of parts with two joint fittings of each type shown in FIGS. 4A, 4B, 4C, 4D, 4E, 4F, 4G, and, 4H. In this way, both compression joints for copper and steel pipe and press fittings for copper and steel pipe, as well as male and female threaded connections may be accommodated. Of course, the kit of parts likely would only include either the press joints for copper pipe with either two rings (i.e., as shown in FIGS. 2C and 4C) or one ring (i.e., as shown in FIGS. 2H and 4H).

Preferably, the conduits 18, 28 and 118, 128 have sufficient rigidity to support the weight of the water meter valve without significant sagging. As readily apparent to one of ordinary skill in the art, the conduits preferably have a slight amount of play or flexibility to accommodate installation of the water meter.

In the preferred embodiments of FIGS. 1 and 3, the inlet and the outlet of the first valve are substantially perpendicular to one another and the inlet and the outlet of the second valve are substantially perpendicular to one another. As used herein, the phrase "substantially perpendicular" includes an arrangement in which the inlet and the outlet of the valve (i.e., the first valve or the second valve) are oriented at an angle of about 90° to about 100° to one another. For example, it may be desired to arrange the inlet and the outlet of the first valve at an angle of about 100° and also to arrange the inlet and the outlet of the second valve at an angle of about 100°. In this way, water flow through the valves may be improved and the curvature of the conduits 18, 28 or 118, 128 may be improved because the outlet of the first valve and the inlet of the second valve are slightly oriented toward a common plane containing the inlet and the outlet of the water meter. When the inlet and outlet of the first valve are oriented at an angle of about 100° to one another and the inlet and the outlet of the second valve are oriented at an angle of about 100° to one another, the first outlet of the first valve and the second inlet of the second valve are oriented substantially 180° apart from one another.

The principles, preferred embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. A valve arrangement for use with a water meter, comprising:

a first valve comprising a first valve housing, a first inlet, and a first outlet, the first inlet and the first outlet of the first valve being oriented substantially perpendicular to one another;

a second valve comprising a second valve housing, a second inlet, and a second outlet, the second inlet and the second outlet of the second valve being oriented substantially perpendicular to one another; said first inlet of the first valve and said second outlet of the second valve being substantially coaxial with one another, and said first outlet of the first valve and said second inlet of said second valve being oriented substantially 180° apart from one another with respect to a longitudinal axis of the valve arrangement passing along said first inlet of the first valve and said second outlet of the second valve, said first valve housing and said second valve housing being joined together by a connection member, a first substantially U-shaped conduit having a first end in fluid communication with said first outlet and a second end configured for connection to an inlet of a water meter, the first substantially U-shaped conduit being oriented slightly upwardly; and, a second substantially U-shaped conduit having a first end in fluid communication with said second inlet and a second end configured for connection to an outlet of the water meter, the second substantially U-shaped conduit being oriented slightly downwardly so that the second end of the first substantially U-shaped conduit and the second end of the second substantially U-shaped conduit are generally coaxial with one another and spaced apart a distance to receive the water meter therebetween, said second end of the first substantially U-shaped conduit and said second end of the second substantially U-shaped conduit being generally opposite one another to receive the water meter therebetween.

2. The valve arrangement of claim 1, wherein said connection member is integrally provided with said first valve housing and said second valve housing, and wherein said connection member does not provide fluid communication between said first valve and said second valve.

3. The valve arrangement of claim 2, wherein said connection member is solid.

4. The valve arrangement of claim 3, wherein each of said first inlet and said second outlet comprises male threads.

5. The valve arrangement of claim 3 wherein each of said first inlet and said second outlet comprises a swivel nut having female threads.

6. The valve arrangement of claim 1 further comprising a pipeline attachment member for said first inlet.

7. The valve arrangement of claim 6 wherein said pipeline attachment member comprises a compression joint for copper pipe.

8. The valve arrangement of claim 6 wherein said pipeline attachment member comprises a compression joint for steel pipe.

9. The valve arrangement of claim 6 wherein said pipeline attachment member comprises a press fitting for copper pipe.

10. The valve arrangement of claim 6 wherein said pipeline attachment member comprises a press fitting for steel pipe.

11. The valve arrangement of claim 1 wherein said connection member is solid and integrally provided with said first valve housing and said second valve housing, and wherein said connection member does not provide fluid communication between said first valve and said second valve, said valve arrangement further comprising:
  a first pipeline attachment member for said first inlet, said first pipeline attachment member comprising one of a) a compression joint for copper pipe, b) a compression joint for steel pipe, c) a press fitting for copper pipe, d) a press fitting for steel pipe, e) a capillary end joint for copper pipe, f) a male thread joint fitting, and g) a female thread joint fitting; and,
  a second pipeline attachment member for said second outlet, said second pipeline attachment member comprising one of a) a compression joint for copper pipe, b) a compression joint for steel pipe, c) a press fitting for copper pipe, d) a press fitting for steel pipe, e) a capillary end joint for copper pipe, f) a male thread joint fitting, and g) a female thread joint fitting.

12. The valve arrangement of claim 11 wherein each of said first inlet and said second outlet comprises male threads, said first pipeline attachment member and said second pipeline attachment member each comprising a swivel nut with female threads.

13. The valve arrangement of claim 11 wherein each of said first inlet and said second outlet comprises a swivel nut having female threads, said first pipeline attachment member and said second pipeline attachment member each comprising male threads.

14. A valve arrangement for use with a water meter, comprising:
  a first valve comprising a first valve housing, a first inlet, and a first outlet, the first inlet and the first outlet of the first valve being oriented substantially perpendicular to one another;
  a second valve comprising a second valve housing, a second inlet, and a second outlet, the second inlet and the second outlet of the second valve being oriented substantially perpendicular to one another; said first inlet of the first valve and said second outlet of the second valve being substantially coaxial with one another, and said first outlet of the first valve and said second inlet of said second valve being oriented substantially 180° apart from one another with respect to a longitudinal axis of the valve arrangement passing along said first inlet of the first valve and said second outlet of the second valve, said first valve housing and said second valve housing being joined together by a connection member,
  a first substantially U-shaped conduit having a first end in fluid communication with said first outlet and a second end adapted for connection to an inlet of a water meter, the first substantially U-shaped conduit being oriented slightly downwardly; and,
  a second substantially U-shaped conduit having a first end in fluid communication with said second inlet and a second end adapted for connection to an outlet of the water meter, the second substantially U-shaped conduit being oriented slightly upwardly so that the second end of the first substantially U-shaped conduit and the second end of the second substantially U-shaped conduit are generally coaxial with one another and spaced apart a distance to receive the water meter therebetween, said second end of the first substantially U-shaped conduit and said second end of the second substantially U-shaped conduit being generally opposite one another to receive the water meter therebetween.

* * * * *